April 28, 1970 R. EVRARD 3,508,441
PRESSURE MEASURING DEVICE
Filed April 10, 1968 2 Sheets-Sheet 1

INVENTOR.
ROBERT EVRARD
BY
AGENT

United States Patent Office 3,508,441
Patented Apr. 28, 1970

3,508,441
PRESSURE MEASURING DEVICE
Robert Evrard, Champigny-sur-Marne, France, assignor by mesne assignments, to U.S. Philips Corporation, New York, N.Y., a corporation of Delaware
Filed Apr. 10, 1968, Ser. No. 720,011
Claims priority, application France, Apr. 10, 1967, 102,070
Int. Cl. G01l 21/26
U.S. Cl. 73—388                                                7 Claims

ABSTRACT OF THE DISCLOSURE

A device for measuring very low pressure employing an element within a chamber in which the ambient pressure is to be measured, the element being rotatable about an axis of symmetry and subjected to a mechanical moment produced by molecules striking part of the surface of the rotatable element and accelerated by their contact with a hot surface. The rotatable element is suspended in a magnetic field of revolution about a vertical axis which field diverges in an upward direction. A body having magnetic properties is arranged in the proximity of the rotatable element which causes that element to rotate about its axis by guiding the magnetic flux to the vicinity of the vertical element after which the body is removed.

---

The invention relates to a pressure measuring instrument of the thermomolecular type as disclosed in U.S. Patent 3,357,254. Such instruments comprise inside the space whose pressure has to be measured an element adapted to rotate about an axis of symmetry and subjected to a mechanical moment produced by molecules striking part of the surface and accelerated by their contact with a hot surface. The value of said moment is a measure for the pressure.

This value is measured by counting the number of rotations of the movable element during appropriate time intervals.

The movable element is usually made of diamagnetic material such as graphite; it is suspended in a magnetic field of revolution, diverging in upward direction, while the axis of symmetry about which the element is adapted to rotate coincides with the vertical axis of revolution of said fields.

It is difficult to cause this element to rotate by mechanical means. The rotation may be started in practice by means of the "levitation" produced by an abrupt generation of the magnetic field. The speed and the direction of this rotation are then uncontrollable, which may cause trouble. The rotation may furthermore be caused by the moment to be measured, which is allowed to act for a sufficient period of time before the measurement is carried out. This involves loss of time.

An object of the invention is to provide a method of causing the movable, diamagnetic element of a thermomolecular measuring instrument to rotate, which element is suspended in a magnetic field of revolution about a vertical axis, which field diverges in an upward direction.

This method is characterized in that at least one body having magnetic properties is arranged in the proximity of said element and is then caused to rotate about its axis, after which said body is removed.

The purpose of such a body consisting for example of a ferromagnetic or a permanent-magnetic material magnetized in the direction of the field is to guide the magnetic flux to the vicinity of the movable element. The symmetry of revolution of the field required for the measurement proper is thus disturbed in order to start the rotation of the element. The field in which the element is floating is attenuated in the vertical plane going through the axis of revolution and the body. Since the element is diamagnetic, it tends to arrange its major face transversely of said plane. The rotation of the magnetic body, hence of said plane about the vertical axis thus produces the rotation of the element. When the appropriate speed of rotation is attained, the symmetry of the field of suspension is restored by moving away the ferromagnetic body.

If a body is employed, which is magnetized in a direction opposite that of the field, the diamagnetic element will arrange itself at right angles to said plane, while otherwise the operation remains the same.

One embodiment of the invention will now be described more fully with reference to the drawing. The steps taken in connection with this embodiment form part of the present invention, within the scope of which other equivalent parts may be used.

Figure 1:
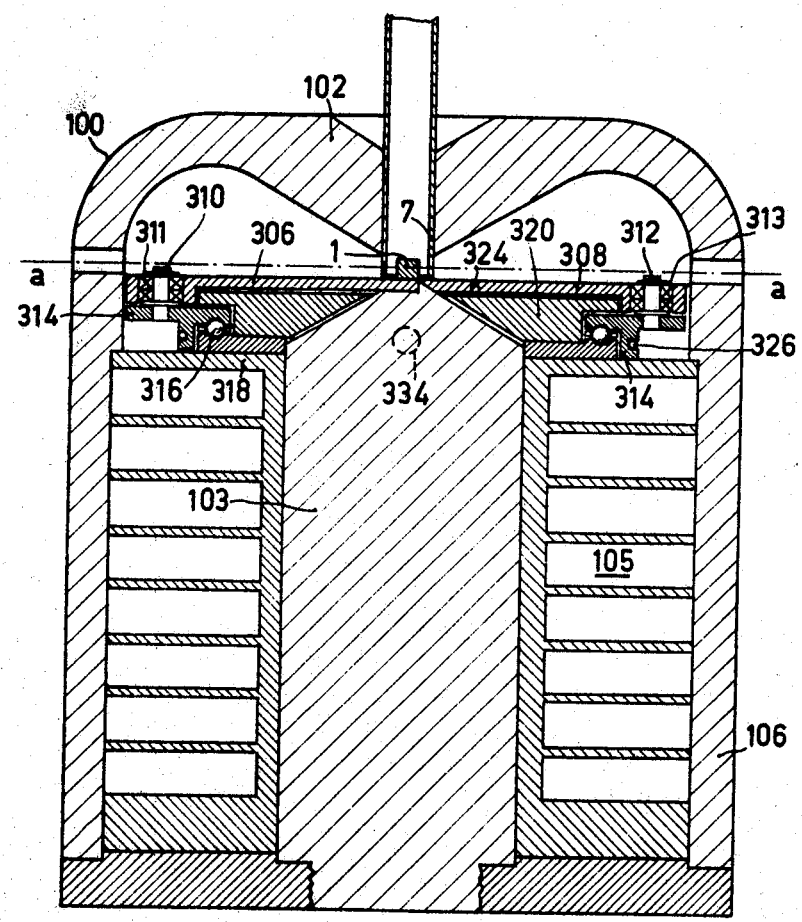
FIG. 1 is a vertical, axial sectional view of the thermomolecular measuring instrument according to the invention. Some components are not shown in section in order to clarify the operation.

The figures show the pole pieces 102 and 103, which form together with the wall 106 and the coil 105 an electro-magnet 100 by the effect of which the movable diamagnetic element 1 is "suspended" (levitated). The rotation of the element 1 permits measurement of the pressure. As is indicated in U.S. Patent 3,357,254 this element is formed by a small graphite disc. It is arranged in the vertical axis of the measuring instrument inside the space 7, which forms the source of heat. Under the action of its weight and of the field the element is in a state of equilibrium in a vertical plane of arbitrary orientation. The element is freely rotatable about the vertical axis of symmetry of the magnetic "levitation" field, which axis substantially coincides with one of the diameters of the element. The rotation about this axis is initiated by means of two small weak-iron bodies 302 and 304, which guide the magnetic flux in the gap on either side of the graphite disc.

Figure 2:
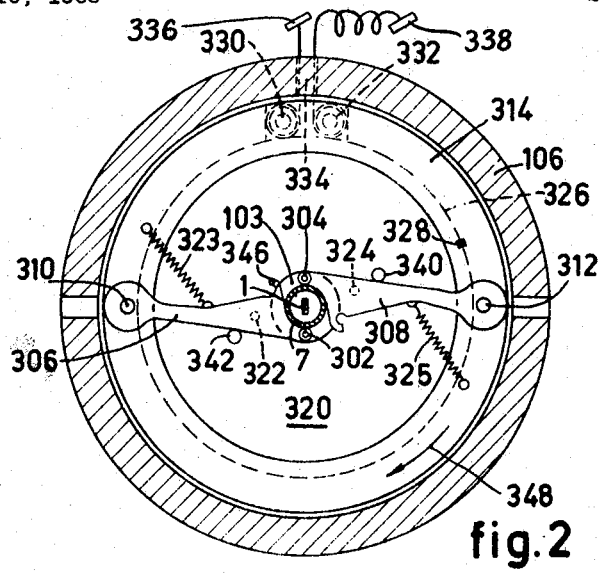
FIG. 2 is a horizontal sectional view of the same measuring instrument taken along the plane a—a of FIG. 1 at the beginning of the rotation.

These two bodies are arranged as near as possible the disc 1, that is to say, completely against the wall of the space 7, which is illustrated in FIG. 2.

As stated above, these ferromagnetic bodies 302 and 304 channel the magnetic flux and attenuate the field between them, the main direction of which is vertical. Since the disc 1 has diamagnetic properties, it orientates itself in the vertical plane going through the bodies 302 and 304 and extending through them as is indicated in FIG. 2.

Each of the bodies is secured to the end of a copper arms 306 and 308 respectively, which is adapted to be turned about pivots 310 and 312 respectively by means of ball bearings 311 and 313 respectively. These pivots are arranged symmetrically on a plate 314, which can be rotated by means of a ball bearing 316 on a stationary disc 318, to which the disc 320 is secured. (FIG. 1.)

By means of the balls 322 and 324, freely rotatable on the lower side, the arms 306 and 308 can move with slight friction across the disc 320, even if they are urged by the action of the magnetic field on the bodies 302 and 304 onto the disc. The arms are furthermore provided with resetting springs 323 and 325, connecting each of the arms with a fixed point of the rotating disc 314 and which tend to urge the bodies 302 and 304 against the wall of the space 7. On the lower side the rotatable plate 314 is provided with a circular groove along which is taken a nylon cable 326, which is fixed to the plate at a point 328. This cable passes along pulleys 330 and 332 through an opening 334 so that the ends provided with handles 336 and 338 are located outside the measuring instrument.

On the disc 320 are finally arranged symmetrically two pinions 340 and 342, with which two hooks 344 and 346 (FIG. 3) respectively are adapted to cooperate, which hooks are secured to the arms 306 and 308 respectively.

Figure 3:
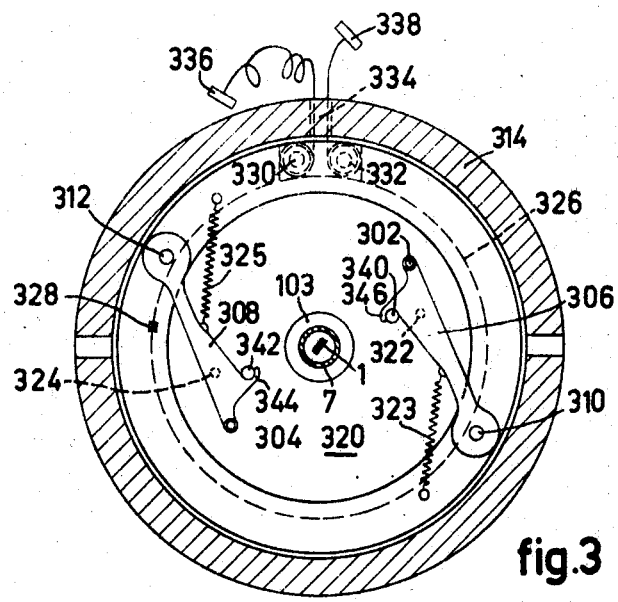
FIG. 3 is the same sectional view as FIG. 2 at the end of the initiation of the rotation.

From the position shown in FIG. 2 the disc 1 is caused to rotate by pulling the handle 336. The plate 314 then rotates in the direction of the arrow 348 and moves the pivots 310 and 312, as well as the ferromagnetic bodies, which engage the wall of the space 7 so that they remain in diametrically opposite positions. As stated above, the disc 1 maintains itself always in line with said bodies, which means that it attains the same speed of rotation as the plate 314. When the plate has turned through slightly less than 180°, the arms 306 and 308 come into contact with the pinions 340 and 342, across which the glide pivotally so that the bodies 302 and 304 are moved away symmetrically from the space 7. The disturbance of the magnetic field produced by said bodies thus disappears gradually, so that the disc 1 can continue rotating freely. Subsequently the pressure prevailing in the space 7 can be measured in the manner described in U.S. Patent 3,357,254. The plate 314 is stopped when the position shown in FIG. 3 is attained in which the hooks 344 and 346 abut against the pinions 340 and 342.

After termination of the measurement or under any other condition the disc 1 can again be caused to rotate simply by pulling the handle 338.

It will be obvious that the invention is not restricted to the embodiment shown. The plate 314 may be caused to rotate in a different manner by means of a wound cable, for example, with the aid of a motor. The ferromagnetic bodies 302 and 304 may be displaced by other means than by the pivotal movements of the arms 306 and 308. It is even imaginable to use a single ferromagnetic body. However, the latter solution would involve serious difficulties. It is the very advantage of the device described that the disturbance produced in the magnetic field is symmetrical, so that this disturbance affects only the disc 1 substantially without changing the state of equilibrium of the vertical diameter of the disc in the diverging magnetic field. When the disturbance disappears gradually, while the symmetry is maintained, said diameter remains in the stable state of equilibrium, whereas otherwise the disc would oscillate about said state so that the measurement would be disturbed.

What is claimed is:

1. A method of causing a moveable, diamagnetic element of a thermomolecular measuring instrument to rotate, which element is held in suspended position in a magnetic field of revolution about a vertical axis, which field diverges in an upward direction comprising the steps of placing at least one body having magnetic properties in the proximity to said element, rotating said body about said axis, and thereafter removing said body when said element rotates.

2. A method as claimed in claim 1 in which two of said bodies having magnetic properties are positioned symmetrically relatively to said vertical axis and thereafter removed.

3. A method as claimed in claim 1 characterized in that said bodies consist of ferromagnetic material.

4. In a thermomolecular measuring instrument having a rotatable diamagnetic element suspended in a magnetic field, at least one moveable body having magnetic properties, means for positioning said body in the proximity of said element, for rotating said body about said axis, and for removing the body when said element rotates.

5. A device as claimed in claim 4 characterized in that two bodies having magnetic properties are provided, while said means are capable of arranging these bodies symmetrically to said vertical axis and of removing them.

6. A device as claimed in claim 5 characterized in that said bodies consist of ferromagnetic material.

7. A device as claimed in claim 5 characterized in that said means comprise a plate adapted to rotate about said vertical axis, two symmetrically arranged arms for supporting said two bodies, pivot means on said plate connected to said arms and comprising members arranged symmetrically about said axis for pivoting said arms during the rotation of the plate.

References Cited

UNITED STATES PATENTS 3,357,254  12/1967  Evrard _____ 73—398

DONALD O. WOODIEL, Primary Examiner

U.S. Cl. X.R.

73—398